United States Patent
Xie et al.

(10) Patent No.: US 12,308,403 B2
(45) Date of Patent: May 20, 2025

(54) APPARATUS FOR EFFICIENTLY PRETREATING AND RECYCLING WASTE BATTERY

(71) Applicants: Guangdong Brunp Recycling Technology Co., Ltd., Foshan (CN); Hunan Brunp Recycling Technology Co., Ltd., Changsha (CN)

(72) Inventors: Yinghao Xie, Foshan (CN); Aixia Li, Foshan (CN); Xuemei Zhang, Foshan (CN); Haijun Yu, Foshan (CN); Changdong Li, Foshan (CN)

(73) Assignees: Guangdong Brunp Recycling Technology Co., Ltd., Foshan (CN); Hunan Brunp Recycling Technology Co., Ltd., Changsha (CN)

( * ) Notice: Subject to any disclaimer, the term of this patent is extended or adjusted under 35 U.S.C. 154(b) by 0 days.

(21) Appl. No.: 18/284,736

(22) PCT Filed: Sep. 22, 2022

(86) PCT No.: PCT/CN2022/120642
§ 371 (c)(1),
(2) Date: Sep. 28, 2023

(87) PCT Pub. No.: WO2024/016468
PCT Pub. Date: Jan. 25, 2024

(65) Prior Publication Data
US 2025/0079542 A1  Mar. 6, 2025

(30) Foreign Application Priority Data
Jul. 21, 2022 (CN) .......................... 202210857686.0

(51) Int. Cl.
*H01M 10/54* (2006.01)
*B02C 18/10* (2006.01)
(Continued)

(52) U.S. Cl.
CPC ............. *H01M 10/54* (2013.01); *B02C 18/10* (2013.01); *B02C 23/16* (2013.01); *B04B 9/02* (2013.01);
(Continued)

(58) Field of Classification Search
CPC ........ H01M 10/54; B02C 18/10; B02C 23/16; B02C 2023/16; B04B 9/02; B04B 11/00; B65G 51/00; C22B 3/02
(Continued)

(56) References Cited

U.S. PATENT DOCUMENTS 7,833,646 B2 * 11/2010 Zenger .................... C22B 7/005
429/49
11,450,902 B2 * 9/2022 Cao .......................... C22B 7/001
(Continued)

FOREIGN PATENT DOCUMENTS

CN   101183740 A   5/2008
CN   101212074 A   7/2008
(Continued)

OTHER PUBLICATIONS

CN110788120, Yan et al., A device For Waste Lithium Battery, Feb. 14, 2020 (Year: 2020).*
(Continued)

*Primary Examiner* — Jessee R Roe
*Assistant Examiner* — Michael Aboagye
(74) *Attorney, Agent, or Firm* — Leason Ellis LLP

(57) ABSTRACT

Disclosed is an apparatus for efficiently pretreating and recycling a waste battery, which includes a bottom plate, a recycling device, a conveying device and a treatment device, and one end of a top portion of the bottom plate is fixedly mounted with a bottom portion of the conveying device. According to the invention, by arranging a fixing assembly and the recycling device, a suction pump can suck a slurry (Continued)

and an electrolyte in a battery downwardly for dropping, and a driving assembly can rapidly convey the slurry and the electrolyte in the battery to the treatment device for treatment at the same time.

10 Claims, 11 Drawing Sheets

(51) Int. Cl.
  *B02C 23/16* (2006.01)
  *B04B 9/02* (2006.01)
  *B04B 11/00* (2006.01)
  *B65G 51/00* (2006.01)
  *C22B 3/02* (2006.01)
(52) U.S. Cl.
  CPC .............. *B04B 11/00* (2013.01); *B65G 51/00* (2013.01); *C22B 3/02* (2013.01); *B02C 2023/165* (2013.01)
(58) Field of Classification Search
  USPC ........................................................ 266/115
  See application file for complete search history.

(56) References Cited

U.S. PATENT DOCUMENTS

| | | | | |
|---|---|---|---|---|
| 11,894,531 | B2* | 2/2024 | Ning | ................ H01M 10/0525 |
| 12,119,463 | B2* | 10/2024 | Hanisch | ................ H01M 6/52 |
| 2017/0077564 | A1 | 3/2017 | Wang et al. | |
| 2021/0203017 | A1 | 7/2021 | Cheng | |

FOREIGN PATENT DOCUMENTS

| | | | | |
|---|---|---|---|---|
| CN | 102029283 | A | 4/2011 | |
| CN | 102208707 | A | 10/2011 | |
| CN | 207371677 | U | 5/2018 | |
| CN | 209329087 | U | 8/2019 | |
| CN | 110788120 | * | 2/2020 | ............ H01M 10/54 |
| CN | 111036651 | A | 4/2020 | |
| CN | 111841832 | A | 10/2020 | |
| CN | 112670609 | A | 4/2021 | |
| CN | 113458119 | * | 10/2021 | ............ B02C 15/00 |
| CN | 113648670 | A | 11/2021 | |
| JP | 2014-55312 | A | 3/2014 | |

OTHER PUBLICATIONS

CN113458119, Han et al., Lead-Acid Battery Environment-Friendly Recycling Device and Using Method, Oct. 1, 2021 (Year: 2021).*
China Search Report, Chinese Patent Application No. 202210857686.0, dated, Mar. 14, 2023, 4 pages.
PCT Search Report, PCT Application No. PCT/CN2022/120642, dated Dec. 26, 2022, 6 pages.
PCT Written Opinion, PCT Application No. PCT/CN2022/120642, dated Dec. 26, 2022, 5 pages.
Notification to Grant in CN Application No. 202210857686.0, mailed Mar. 19, 2023, an English Translation attached herewith (3 pages).

* cited by examiner

APPARATUS FOR EFFICIENTLY PRETREATING AND RECYCLING WASTE BATTERY

CROSS-REFERENCE TO RELATED APPLICATION

This application is a national stage filing under 35 U.S.C. § 371 of international application number PCT/CN2022/120642, filed Sep. 22, 2022, which claims priority to Chinese patent application No. 202210857686.0, filed Jul. 21, 2022. The contents of these applications are incorporated herein by reference in their entirety.

TECHNICAL FIELD

The present invention relates to the field of battery slurry recycling and treatment technologies, and more particularly, to an apparatus for efficiently pretreating and recycling a waste battery.

BACKGROUND

Existing lithium-ion batteries are widely applied in many fields due to a high energy density, a light weight and a long service life, and main parts of the lithium-ion batteries are positive and negative plates, wherein main components of a positive electrode slurry of a lithium battery are: a positive electrode material, carbon powder, N-Methyl Pyrrolidone shortened to NMP (solvent), polyvinylidene fluoride shortened to PVDF and other impurities. In order to save costs and protect environment, it is necessary to recycle a positive electrode waste slurry and an electrolyte.

In the existing technology, for example, according to "a method and apparatus for recycling a waste lithium battery slurry containing NMP" with China patent number CN113648670A, the method comprises pretreating a lithium battery slurry, then carrying out centrifugal spray drying on the pretreated lithium battery slurry, and separating a solid phase from a solvent. Centrifugal spray is used in the method, which may completely and efficiently separate the positive electrode material from the NMP, and impurity elements are not introduced in the process, which improves a purity of the NMP. Therefore, the method has low treatment costs, reduces environment pollution, and has a great industrial application prospect. The solution further discloses the apparatus for recycling the lithium battery slurry, which is a centrifugal spray drying system, and comprises a spray chamber, a cyclone separator, a condenser, a condensate storage tank and a rectifying tower. The system is improved on an original centrifugal spray drying apparatus, and designed by combining the centrifugal spray drying with the condensation and recycling of the NMP, so that the NMP may be directly recycled after the positive electrode material is separated from the NMP. Therefore, the apparatus has a high treatment efficiency, and may realize continuous production.

Currently, the method for recycling the positive electrode slurry of the waste lithium battery generally comprises the following steps of: stirring and slurrying, filtering by a funnel, drying, ball-milling, separating by a fluidized bed, treating tail gas by a packing absorption tower, and screening. However, existing recycling devices have a complicated recycling flow and an extremely low operating efficiency, and secondly, when the slurry and the electrolyte in the waste battery are recycled, the electrolyte of the lithium battery is extremely volatile and toxic, harmful gases of phosphorus pentafluoride and hydrogen fluoride in decomposition gas produced by the electrolyte are ignored or understood as not being subjected to treatment for volatile substances in the existing technology, and the volatile harmful gases will cause environment pollution. Therefore, there is a room for improvement, and an apparatus for efficiently pretreating and recycling a waste battery is provided aiming at the above problems.

SUMMARY

The present invention aims to provide an apparatus for efficiently pretreating and recycling a waste battery, so as to solve the problem that existing recycling devices have a complicated recycling flow and an extremely low operating efficiency proposed in the background above, and secondly, when a slurry and an electrolyte in the waste battery are recycled, the electrolyte of the lithium battery is extremely volatile and toxic, harmful gases of phosphorus pentafluoride and hydrogen fluoride in decomposition gas produced by the electrolyte are ignored or understood as not being subjected to treatment for volatile substances in the existing technology, and the volatile harmful gases will cause environment pollution.

In order to achieve the object above, the present invention provides the following technical solution: an apparatus for efficiently pretreating and recycling a waste battery comprises a bottom plate, a recycling device, a conveying device and a treatment device, one end of a top portion of the bottom plate is fixedly mounted with a bottom portion of the conveying device, and the other end of the top portion of the bottom plate is fixedly mounted with a bottom portion of the treatment device, wherein the conveying device comprises a controller, a turntable and a supporting frame, a top portion of the turntable is movably mounted with a bottom portion of the controller, a plurality of fixing assemblies are uniformly provided at a bottom portion of the turntable, the fixing assembly comprises a mounting block, a movable rod, a slider, a vacuum negative pressure pump and a sucker, two ends of a bottom portion of the mounting block are symmetrically and fixedly connected with two extension rods, two ends of the movable rod are fixedly mounted with bottom portions of the extension rods, an outer wall of the movable rod is slidably connected with an inner wall of the slider, one end of the movable rod is fixedly connected with a driving assembly, an electric push rod is arranged inside the movable rod, one end of the electric push rod is movably mounted with one end of the driving assembly, the other end of the electric push rod is movably mounted with one end of the slider, a top portion of the vacuum negative pressure pump is fixedly mounted with a bottom portion of the slider, a bottom portion of the vacuum negative pressure pump is movably connected with a top portion of the sucker, the treatment device comprises a base, a material conveying pipe, a centrifuge, a material guiding pipe and a recycling treatment cylinder, the recycling treatment cylinder comprises a housing, a top cover, a connecting rod, a crushing plate, an acid leaching cylinder, a rotating motor and a stop block, an inner side of a top end of the housing is fixedly connected with a fixing ring, an inner wall of the fixing ring is slidably connected with an outer wall of a calcination turntable, a slot is formed to penetrate through one end of a top portion of the calcination turntable, a top portion of the fixing ring is fixedly mounted with a bottom portion of the stop block, the top portion of the calcination turntable is fixedly connected with a bottom portion of the connecting rod, a top portion of the crushing plate is movably connected with a bottom portion of the rotating motor, and a plurality of crushing blades are uniformly arranged outside a bottom end of the rotating motor.

Preferably, an inner wall of the housing is fixedly mounted with an outer wall of the crushing plate, an inner wall of a bottom portion of the housing is fixedly connected with a bottom portion of the acid leaching cylinder, and a leading-out pipe is provided at one side of the acid leaching cylinder.

Preferably, a top portion of the housing is fixedly mounted with a bottom portion of the top cover, and a bottom portion of the housing is fixedly mounted with one end of the top portion of the bottom plate.

Preferably, a bottom portion of the sucker is provided with a battery, a top portion of the base is fixedly mounted with a bottom portion of the centrifuge, and a top portion of the centrifuge is provided with a centrifugal motor.

Preferably, a front side of the centrifuge is fixedly communicated with a separation pipe, one end of a top portion the centrifuge is fixedly communicated with one end of the material guiding pipe, and one side of the centrifuge is fixedly communicated with one end of the material conveying pipe.

Preferably, one end of the material conveying pipe is fixedly connected with a top portion of the top cover, a top portion of the mounting block is fixedly connected with the bottom portion of the turntable, a top portion of the supporting frame is fixedly connected with the bottom portion of the controller, and a bottom portion of the supporting frame is fixedly mounted with the top portion of the bottom plate.

Preferably, the top portion of the turntable is provided with a plurality of connecting lines, the recycling device comprises a fixing plate, a suction pump, a material unloading cylinder and a bearing ring, an outer wall of the material unloading cylinder is fixedly mounted with an inner side of the bearing ring, and a bottom portion of the material unloading cylinder is provided with a through hole.

Preferably, a top portion of the fixing plate is fixedly mounted with a bottom portion of the suction pump, a top portion of the suction pump is movably connected with the bottom portion of the material unloading cylinder, and one side of a bottom end of the material unloading cylinder is fixedly communicated with a material discharging pipe.

Preferably, one end of the material discharging pipe is fixedly communicated with one end of the material guiding pipe, a bottom portion of the bearing ring is uniformly and fixedly connected with four supporting rods, and a bottom portion of the supporting rod is fixedly mounted with the top portion of the fixing plate.

Preferably, the material unloading cylinder comprises a cylinder body, a knocking rod, a circular ring and a striking ball, a top portion of the cylinder body is fixedly mounted with a bottom portion of the circular ring, an inner side of a top end of the cylinder body is symmetrically and fixedly connected with two second bearing rods, an outer wall of the second bearing rod is rotatably connected with a rolling ball, an outer wall of the rolling ball is uniformly and fixedly connected with three supporting rods, an inner side of the cylinder body is symmetrically and fixedly connected with two first bearing rods, an outer wall of the first bearing rod is movably connected with a rotating block, an inner side of the rotating block is fixedly mounted with a bottom end of the knocking rod, a top portion of the knocking rod is fixedly connected with a bottom portion of the striking ball, an inner side of a top end of the knocking rod is provided with a second magnetic block, and an inner side of the bottom end of the knocking rod is provided with a first magnetic block.

Compared with the existing technology, the present invention has the following beneficial effects.

1. In the present invention, by arranging the fixing assembly and the recycling device, the suction pump may suck out the slurry and the electrolyte in the battery downwardly for dropping, and the knocking rod and the striking ball in the material unloading cylinder constantly strike an inner side of the battery, so as to make the battery sway and make the slurry and the electrolyte rapidly drop downwardly into the material unloading cylinder, the driving assembly may make the slider drive the battery to sway left and right at the same time, the fixing assembly can not only facilitate fixing and disassembly of the battery but also make the slurry and the electrolyte in the battery sway to drop rapidly, and the combination of the fixing assembly and the material unloading cylinder may rapidly convey the slurry and the electrolyte in the battery to the treatment device for treatment, thereby improving a recycling efficiency of the slurry and the electrolyte, avoiding decomposition gas and volatile toxic gas produced by the electrolyte from rapidly volatilizing outwardly, and solving the problem that harmful gases volatilized from the electrolyte will cause environment pollution.

2. In the present invention, the slurry and the electrolyte reach the centrifuge through the material discharging pipe and the material guiding pipe, the centrifugal motor and the centrifuge facilitate recycling of the N-Methyl Pyrrolidone (NMP) liquid phase and the electrolyte, and the electrolyte is condensed in a sealed state and purified by activated carbon adsorption, which can eliminate harmful gases of phosphorus pentafluoride and hydrogen fluoride in the decomposition gas, thereby avoiding environment pollution, realizing automatic, harmless and effective recycling of the waste lithium battery, and solving the problem of leakage of the harmful gases in a recycling process of the electrolyte of the waste battery in the existing technology.

3. In the present invention, by arranging the treatment device, the positive electrode material solid phase is subjected to high temperature calcination at the top portion of the calcination turntable, the treated positive electrode material solid phase drops on the top portion of the crushing plate, the crushing blade may crush the positive electrode material solid phase into powder, and the powder of the positive electrode material solid phase goes downwardly to reach the acid leaching cylinder for acid leaching and recycling, so that various metal elements in a positive electrode slurry material are recycled, and the treatment mode increases a recycling rate of the metal elements in the positive electrode material, and then improves an efficiency in an operation process, thereby reaching a highest recycling rate of resources, having a simple operation flow, and realizing a high operating efficiency.

4. In the present invention, when the bottom end of the battery is located at the top portion of the cylinder body of the material unloading cylinder, two rolling balls are rotated by a downward negative pressure adsorption force, after the outer supporting rod touches the bottom end of the knocking rod, the knocking rod may be pressed downwardly to rotate, the striking ball at the top end of the knocking rod strikes an inner wall of a battery case, meanwhile, there is a magnetic attraction force between two second magnetic blocks at the top ends of two knocking rods, and there is a magnetic repulsion force between two first magnetic blocks at the bottom ends, after the supporting rod is far away from the bottom portion of the knocking rod, the knocking rods on two sides are rotated back to original positions in opposite directions under actions of the magnetic forces, and after the next supporting rod touches the bottom portion of the knocking rod again, the above steps are repeated, so as to continuously strike the inner wall of the battery case at a high frequency and accelerate dispersion and dropping of the slurry and the electrolyte in the battery, thereby improving a recycling efficiency of the slurry and the electrolyte in the battery.

Figure 1:
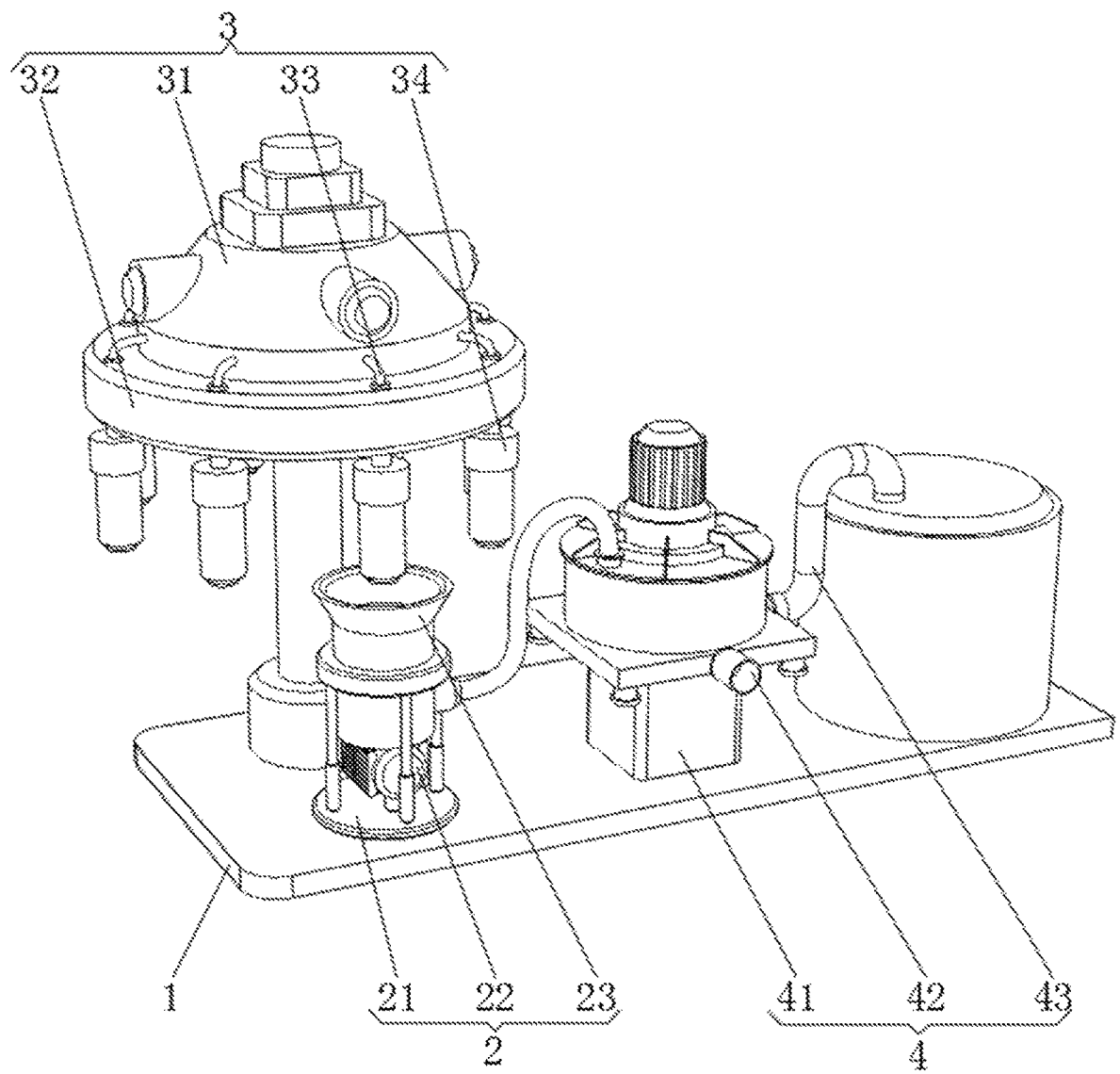
FIG. 1 is a stereoscopic diagram of an apparatus for efficiently pretreating and recycling a waste battery according to the present invention.

1 refers to bottom plate; 2 refers to recycling device; 3 refers to conveying device; 4 refers to treatment device; 21 refers to fixing plate; 22 refers to suction pump; 23 refers to material unloading cylinder; 24 refers to through hole; 25 refers to supporting rod; 26 refers to material discharging pipe; 27 refers to bearing ring; 31 refers to controller; 32 refers to turntable; 33 refers to connecting line; 34 refers to fixing assembly; 35 refers to battery; 36 refers to supporting frame; 41 refers to base; 42 refers to separation pipe; 43 refers to material conveying pipe; 44 refers to recycling treatment cylinder; 45 refers to centrifuge; 46 refers to centrifugal motor; 47 refers to material guiding pipe; 341 refers to mounting block; 342 refers to extension rod; 343 refers to movable rod; 344 refers to slider; 345 refers to vacuum negative pressure pump; 346 refers to sucker; 347 refers to electric push rod; 348 refers to driving assembly; 441 refers to top cover; 442 refers to calcination turntable; 443 refers to connecting rod; 444 refers to crushing plate; 445 refers to crushing blade; 446 refers to acid leaching cylinder; 447 refers to housing; 448 refers to leading-out pipe; 449 refers to stop block; 4410 refers to fixing ring; 4411 refers to slot; 4412 refers to rotating motor; 231 refers to first bearing rod; 232 refers to second bearing rod; 233 refers to circular ring; 234 refers to rolling ball; 235 refers to cylinder body; 236 refers to knocking rod; 237 refers to striking ball; 238 refers to supporting rod; 239 refers to rotating block; 240 refers to first magnetic block; and 241 refers to second magnetic block.

DETAILED DESCRIPTION

The technical solutions in the embodiments of the present invention will be clearly and completely described hereinafter with reference to the drawings in the embodiments of the present invention. Apparently, the described embodiments are only some but not all of the embodiments of the present invention. Based on the embodiments in the present invention, all other embodiments obtained by those of ordinary skills in the art without going through any creative work should fall within the scope of protection of the present invention.

Referring to FIG. 1 to FIG. 11, an apparatus for efficiently pretreating and recycling a waste battery comprises a bottom plate 1, a recycling device 2, a conveying device 3 and a treatment device 4. One end of a top portion of the bottom plate 1 is fixedly mounted with a bottom portion of the conveying device 3, and the other end of the top portion of the bottom plate 1 is fixedly mounted with a bottom portion of the treatment device 4. The conveying device 3 comprises a controller 31, a turntable 32 and a supporting frame 36. Atop portion of the turntable 32 is movably mounted with a bottom portion of the controller 31, and a plurality of fixing assemblies 34 are uniformly provided at a bottom portion of the turntable 32. The fixing assembly 34 comprises a mounting block 341, a movable rod 343, a slider 344, a vacuum negative pressure pump 345 and a sucker 346. Two ends of a bottom portion of the mounting block 341 are symmetrically and fixedly connected with two extension rods 342, two ends of the movable rod 343 are fixedly mounted with bottom portions of the extension rods 342, and an outer wall of the movable rod 343 is slidably connected with an inner wall of the slider 344. One end of the movable rod 343 is fixedly connected with a driving assembly 348, the driving assembly 348 drives the slider 344 to reciprocate on the movable rod 343 through an electric push rod 347, and then the slider 344 drives a battery 35 at a bottom portion to sway left and right. The electric push rod 347 is arranged inside the movable rod 343, one end of the electric push rod 347 is movably mounted with one end of the driving assembly 348, and the other end of the electric push rod 347 is movably mounted with one end of the slider 344. A top portion of the vacuum negative pressure pump 345 is fixedly mounted with a bottom portion of the slider 344, the vacuum negative pressure pump 345 may adsorb the battery 35 at the bottom portion by a negative pressure produced by the sucker 346, and a bottom portion of the vacuum negative pressure pump 345 is movably connected with a top portion of the sucker 346. The treatment device 4 comprises a base 41, a material conveying pipe 43, a centrifuge 45, a material guiding pipe 47 and a recycling treatment cylinder 44. The recycling treatment cylinder 44 comprises a housing 447, a top cover 441, a connecting rod 443, a crushing plate 444, an acid leaching cylinder 446, a rotating motor 4412 and a stop block 449. An inner side of a top end of the housing 447 is fixedly connected with a fixing ring 4410, an inner wall of the fixing ring 4410 is slidably connected with an outer wall of a calcination turntable 442, a slot 4411 is formed to penetrate through one end of a top portion of the calcination turntable 442, a top portion of the fixing ring 4410 is fixedly mounted with a bottom portion of the stop block 449, and the top portion of the calcination turntable 442 is fixedly connected with a bottom portion of the connecting rod 443. A positive electrode material solid phase drops on the top portion of the calcination turntable 442 first, the stop block 449 exerts a blocking effect to avoid the positive electrode material solid phase on the calcination turntable 442 from dropping downwardly, and a high temperature calcination assembly is arranged in the stop block 449. The positive electrode material solid phase is subjected to high temperature calcination at the top portion of the calcination turntable 442 at high temperature, the connecting rod 443 is rotated after treatment, the connecting rod 443 drives the calcination turntable 442 to rotate, and the slot 4411 of the calcination turntable 442 is rotated outwardly, so that the treated positive electrode material solid phase drops downwardly on a top portion of the crushing plate 444. The top portion of the crushing plate 444 is movably connected with a bottom portion of the rotating motor 4412, and a plurality of crushing blades 445 are uniformly arranged outside a bottom end of the rotating motor 4412. The rotating motor 4412 drives the crushing blade 445 at the bottom portion to rotate at a high speed, and the crushing blade 445 may crush the positive electrode material solid phase on the top portion of the crushing plate 444 into powder.

Figure 7:
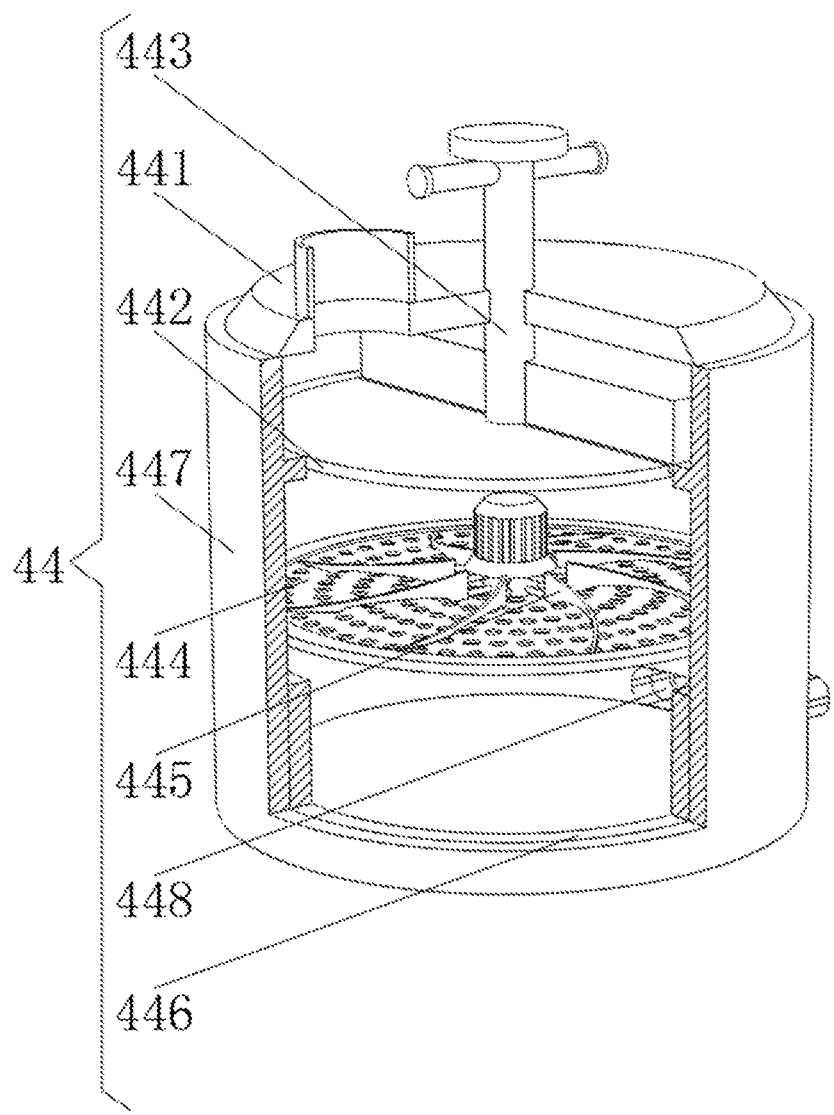
FIG. 7 is a schematic diagram of an internal structure of a recycling treatment cylinder of the apparatus for effectively pretreating and recycling the waste battery according to the present invention.
Figure 8:
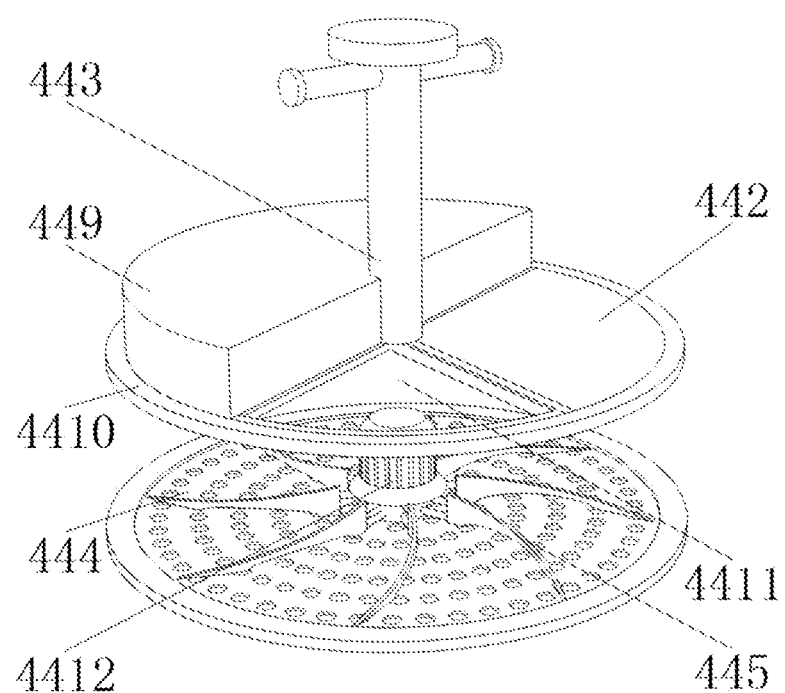
FIG. 8 is a schematic diagram of a partial structure of the recycling treatment cylinder of the apparatus for effectively pretreating and recycling the waste battery according to the present invention.

Referring to FIG. 7 and FIG. 8, an inner wall of the housing 447 is fixedly mounted with an outer wall of the crushing plate 444, an inner wall of a bottom portion of the housing 447 is fixedly connected with a bottom portion of the acid leaching cylinder 446, and a leading-out pipe 448 is provided at one side of the acid leaching cylinder 446. The crushing blade 445 may crush the positive electrode material solid phase on the top portion of the crushing plate 444 into powder, and the powder of the positive electrode material solid phase goes downwardly to the acid leaching cylinder 446 for acid leaching and recycling.

Referring to FIG. 1, FIG. 7 and FIG. 8, a top portion of the housing 447 is fixedly mounted with a bottom portion of the top cover 441, and a bottom portion of the housing 447 is fixedly mounted with one end of the top portion of the bottom plate 1. The top cover 441 is used for ensuring a sealing performance in the housing 447.

Referring to FIG. 3 to FIG. 6, a bottom portion of the sucker 346 is provided with the battery 35, a top portion of the base 41 is fixedly mounted with a bottom portion of the centrifuge 45, and a top portion of the centrifuge 45 is provided with a centrifugal motor 46. The centrifugal motor 46 centrifugally filters and separates a slurry in the centrifuge 45 into the positive electrode material solid phase and an N-Methyl Pyrrolidone (NMP) liquid phase, and the N-Methyl Pyrrolidone (NMP) liquid phase is recycled through a separation pipe 42 on a front side, thus recycling the N-Methyl Pyrrolidone (NMP) liquid phase.

Figure 2:
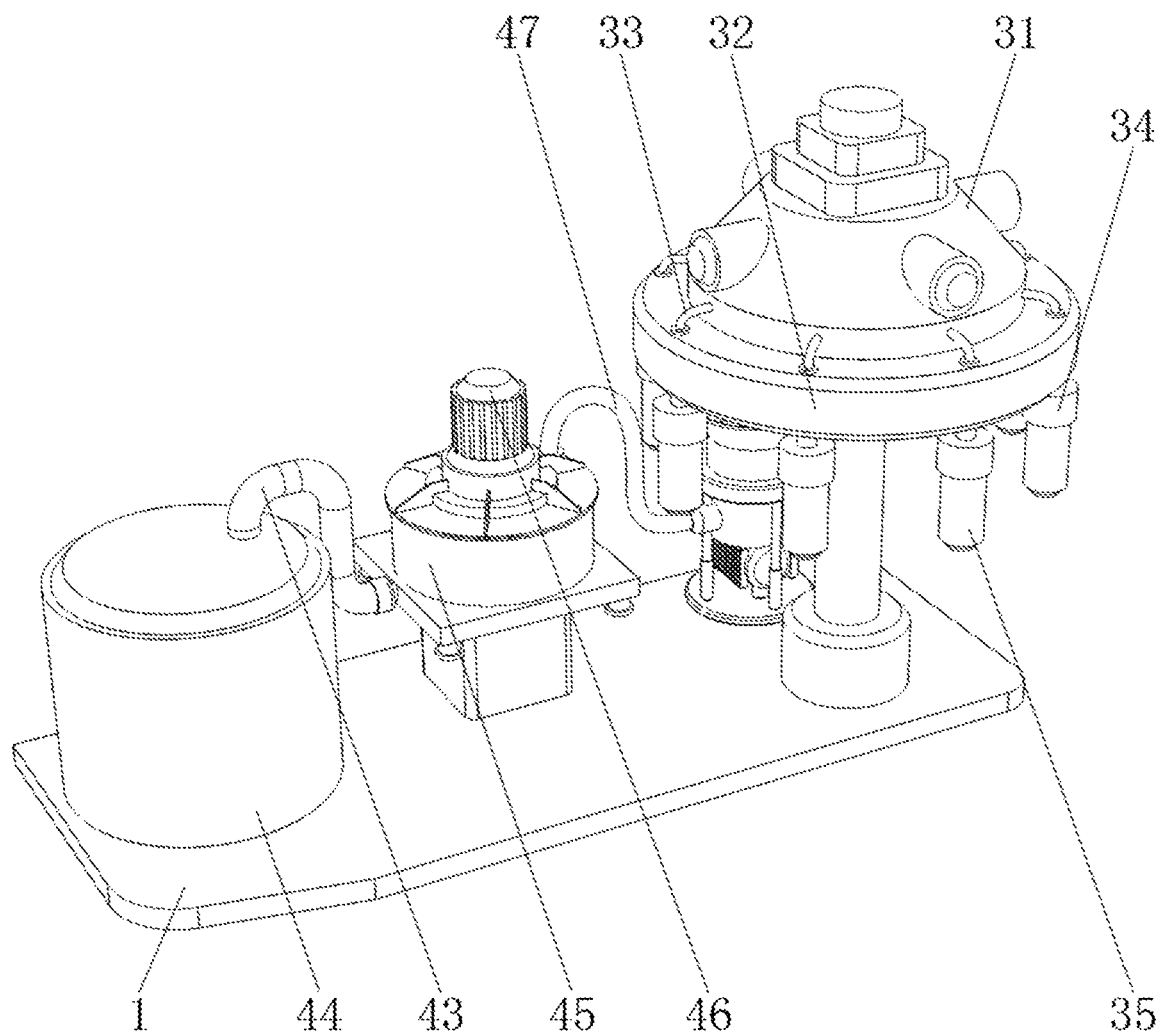
FIG. 2 is a schematic diagram of a rear side structure of the apparatus for effectively pretreating and recycling the waste battery according to the present invention.

Referring to FIG. 1 and FIG. 2, the front side of the centrifuge 45 is fixedly communicated with the separation pipe 42, one end of a top portion the centrifuge 45 is fixedly communicated with one end of the material guiding pipe 47, and one side of the centrifuge 45 is fixedly communicated with one end of the material conveying pipe 43. The material guiding pipe 47 is used for conveying the slurry and the electrolyte in a material unloading cylinder 23 into the centrifuge 45, and the material conveying pipe 43 is used for conveying the positive electrode material solid phase in the centrifuge into the housing 447.

Figure 3:
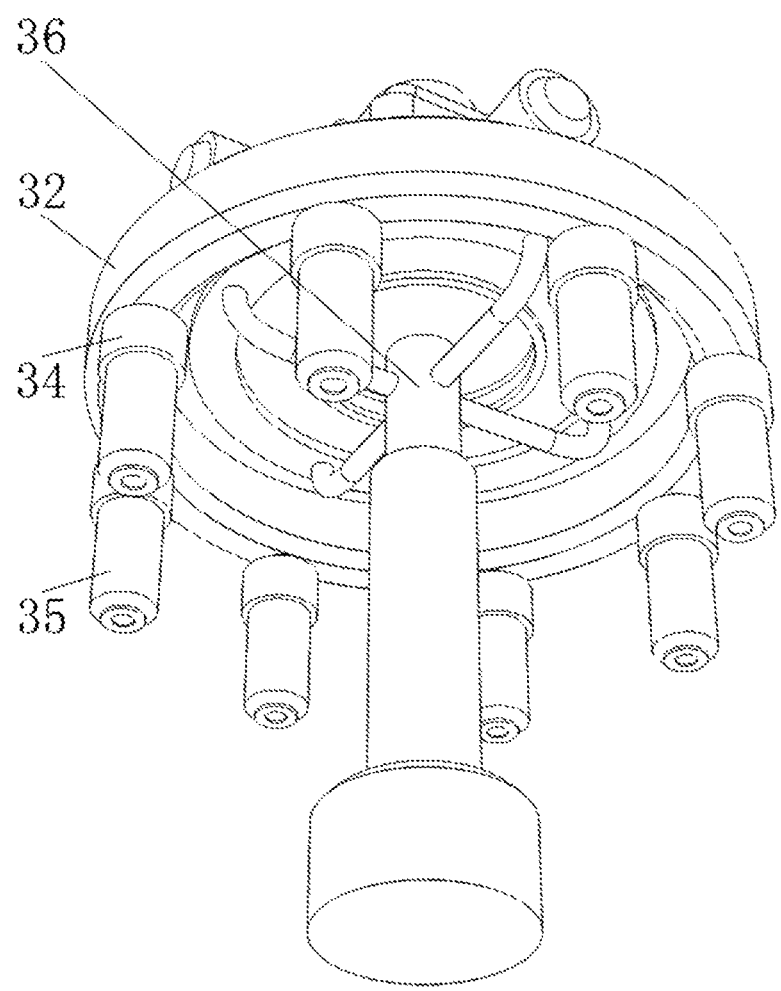
FIG. 3 is a schematic diagram of a bottom view structure of a conveying device of the apparatus for effectively pretreating and recycling the waste battery according to the present invention.

Referring to FIG. 1 to FIG. 3, one end of the material conveying pipe 43 is fixedly connected with a top portion of the top cover 441, a top portion of the mounting block 341 is fixedly connected with the bottom portion of the turntable 32, a top portion of the supporting frame 36 is fixedly connected with the bottom portion of the controller 31, and a bottom portion of the supporting frame 36 is fixedly mounted with the top portion of the bottom plate 1. The supporting frame 36 exerts supporting and fixing effects, and the controller 31 may drive the turntable 32 to rotate and stop regularly.

Referring to FIG. 1 to FIG. 4, the top portion of the turntable 32 is provided with a plurality of connecting lines 33, the recycling device 2 comprises a fixing plate 21, a suction pump 22, the material unloading cylinder 23 and a bearing ring 27, an outer wall of the material unloading cylinder 23 is fixedly mounted with an inner side of the bearing ring 27, and a bottom portion of the material unloading cylinder 23 is provided with a through hole 24. The suction pump 22 may suck the slurry in the battery 35 downwardly through the through hole 24 for dropping, so that the slurry rapidly drops downwardly into the material unloading cylinder 23, and the recycling device 2 may rapidly convey the slurry in the battery 35 to the treatment device 4 for treatment, thereby improving a recovery efficiency of the slurry in the battery 35.

Figure 4:
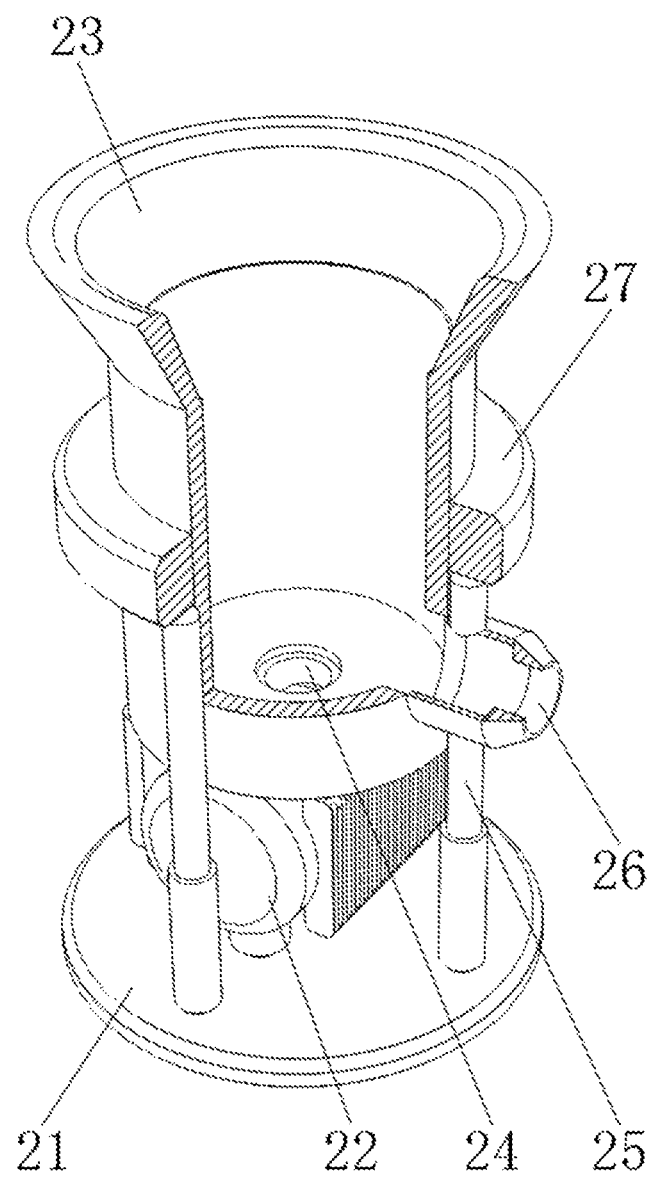
FIG. 4 is a schematic diagram of an internal structure of a recycling device of the apparatus for effectively pretreating and recycling the waste battery according to the present invention.
Figure 5:
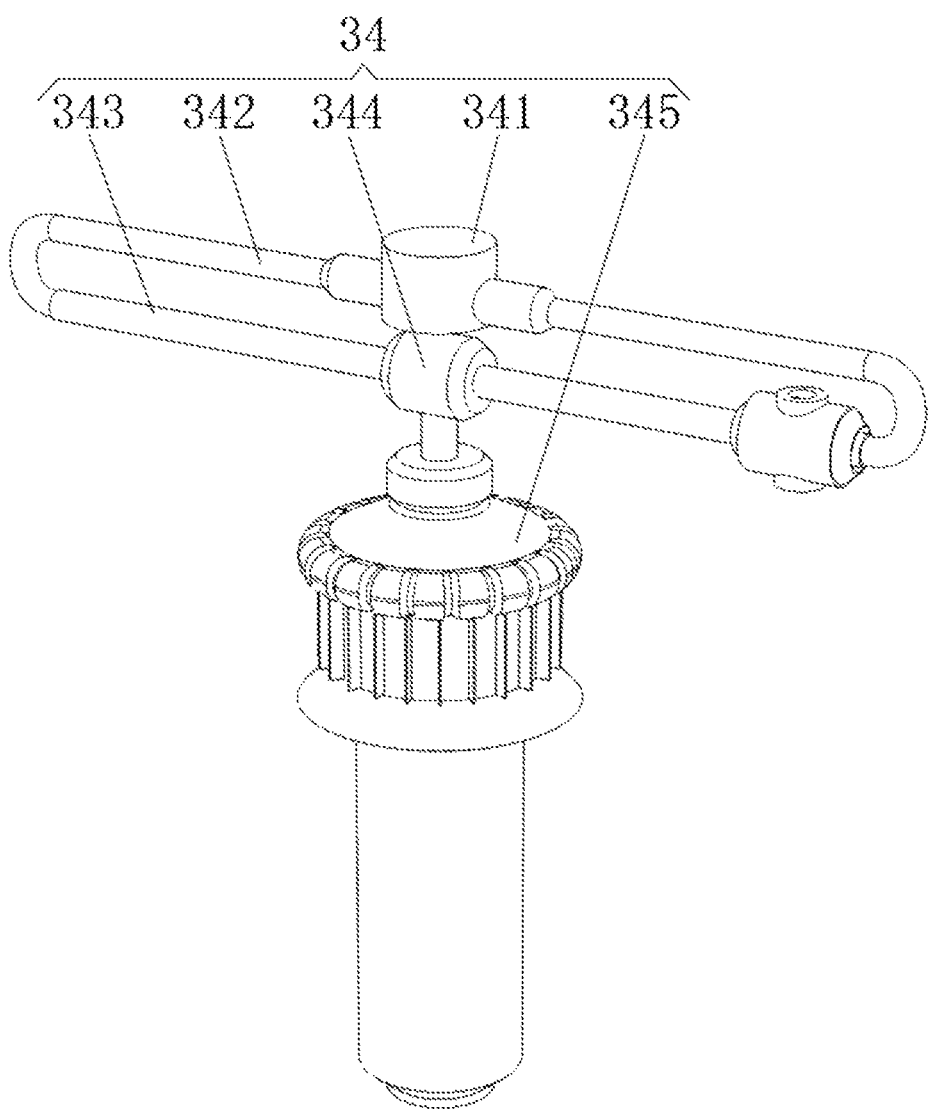
FIG. 5 is a schematic structural diagram of a fixing assembly of the apparatus for effectively pretreating and recycling the waste battery according to the present invention.
Figure 6:
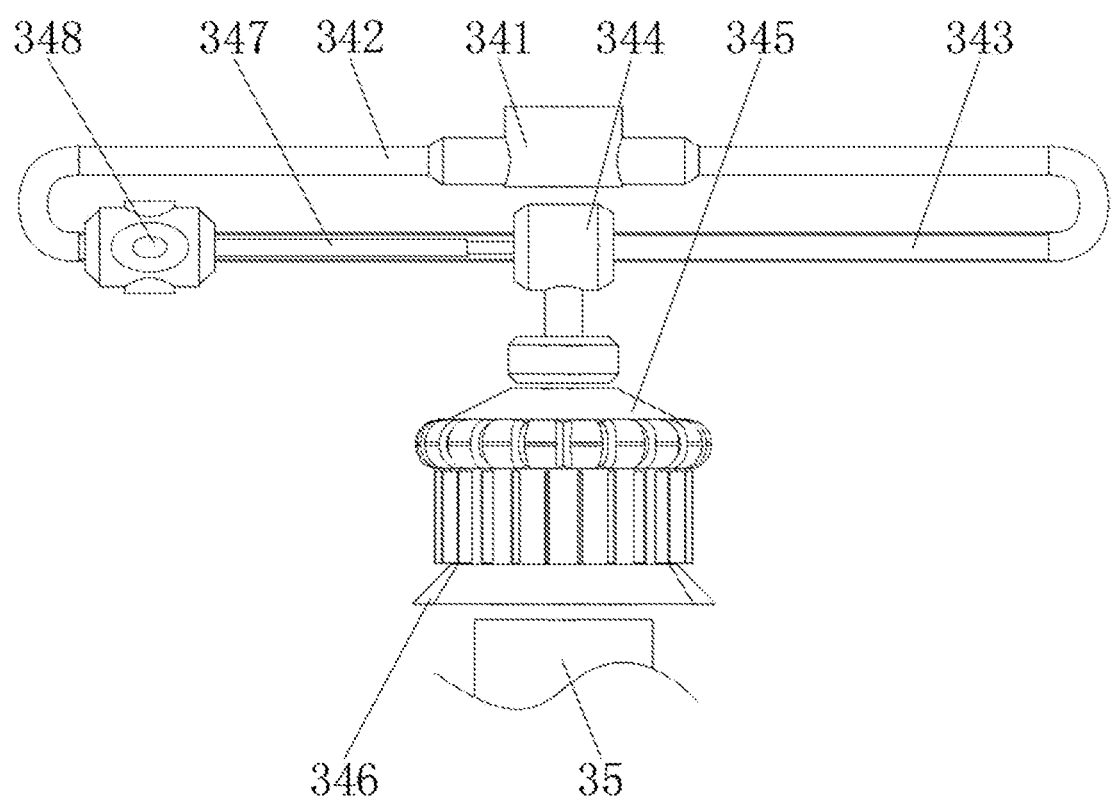
FIG. 6 is a schematic diagram of a front surface of the fixing assembly of the apparatus for effectively pretreating and recycling the waste battery according to the present invention.

Referring to FIG. 1 and FIG. 4, a top portion of the fixing plate 21 is fixedly mounted with a bottom portion of the suction pump 22, a top portion of the suction pump 22 is movably connected with the bottom portion of the material unloading cylinder 23, and one side of a bottom end of the material unloading cylinder 23 is fixedly communicated with a material discharging pipe 26. The fixing assembly 34 can not only facilitate fixing and disassembly of the battery 35, but also make the slurry and the electrolyte in the battery 35 sway to drop rapidly.

Referring to FIG. 1 and FIG. 4, one end of the material discharging pipe 26 is fixedly communicated with one end of the material guiding pipe 47, a bottom portion of the bearing ring 27 is uniformly and fixedly connected with four supporting rods 25, and a bottom portion of the supporting rod 25 is fixedly mounted with the top portion of the fixing plate 21. The bearing ring 27 and the supporting rod 25 exert supporting and fixing effects.

Figure 9:
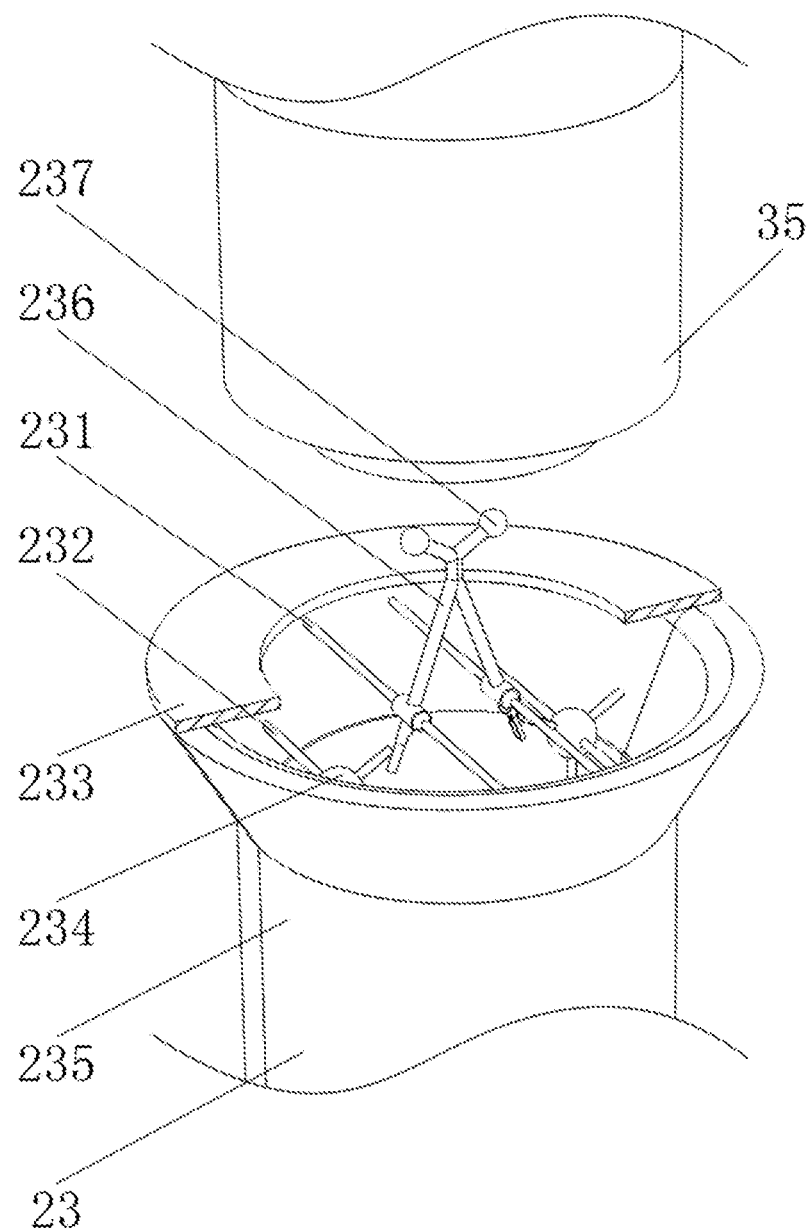
FIG. 9 is a schematic diagram of an internal structure of a material unloading cylinder of the apparatus for effectively pretreating and recycling the waste battery according to the present invention.
Figure 10:
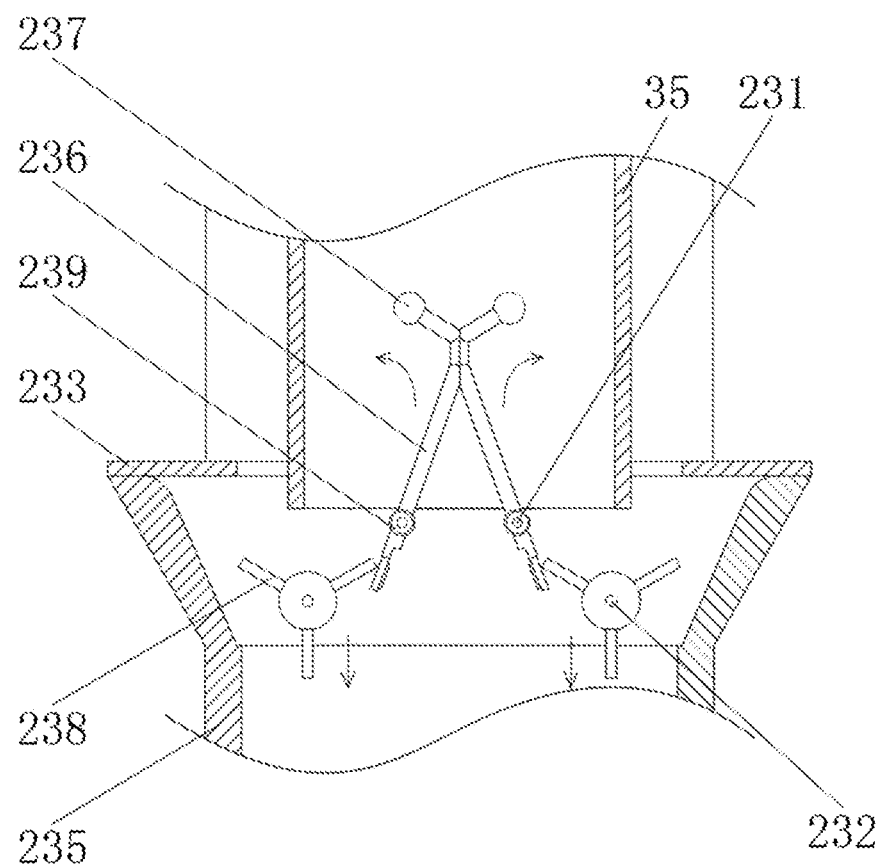
FIG. 10 is a front view of an interior of the material unloading cylinder of the apparatus for effectively pretreating and recycling the waste battery according to the present invention.
Figure 11:
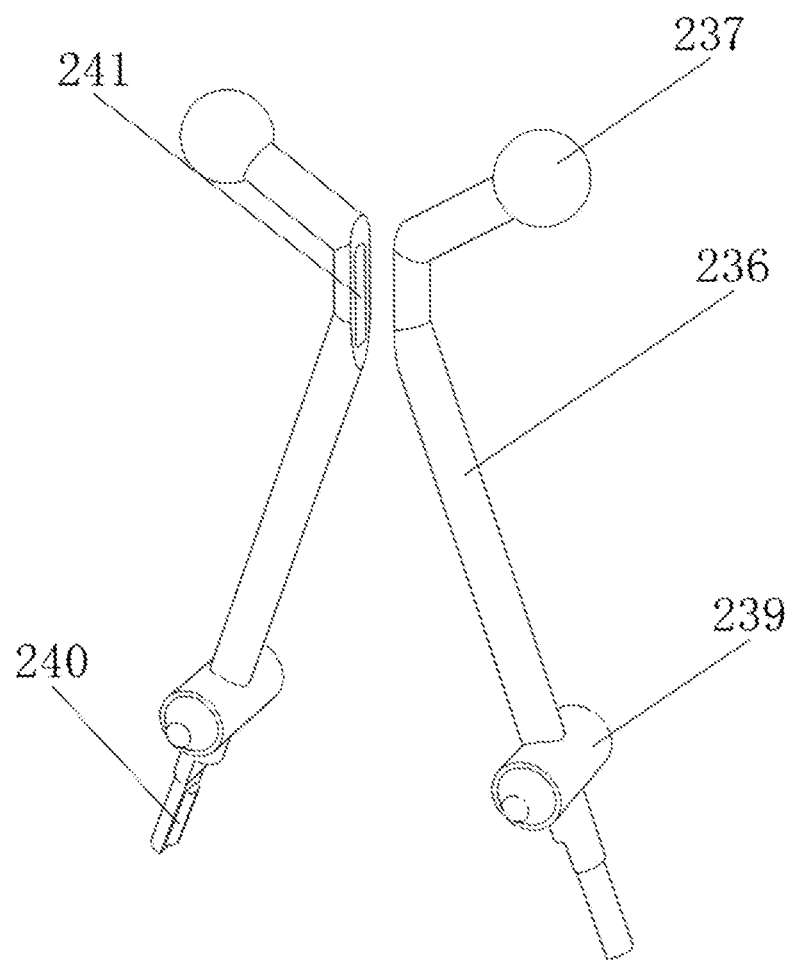
FIG. 11 is a schematic structural diagram of a knocking rod of the apparatus for effectively pretreating and recycling the waste battery according to the present invention.

Referring to FIG. 9 to FIG. 11, the material unloading cylinder 23 comprises a cylinder body 235, a knocking rod 236, a circular ring 233 and a striking ball 237. A top portion of the cylinder body 235 is fixedly mounted with a bottom portion of the circular ring 233, an inner side of a top end of the cylinder body 235 is symmetrically and fixedly connected with two second bearing rods 232, an outer wall of the second bearing rod 232 is rotatably connected with a rolling ball 234, an outer wall of the rolling ball 234 is uniformly and fixedly connected with three supporting rods 238, an inner side of the cylinder body 235 is symmetrically and fixedly connected with two first bearing rods 231, an outer wall of the first bearing rod 231 is movably connected with a rotating block 239, an inner side of the rotating block 239 is fixedly mounted with a bottom end of the knocking rod 236, a top portion of the knocking rod 236 is fixedly connected with a bottom portion of the striking ball 237, an inner side of a top end of the knocking rod 236 is provided with a second magnetic block 241, and an inner side of the bottom end of the knocking rod 236 is provided with a first magnetic block 240. When the bottom end of the battery 35 is located at the top portion of the cylinder body 235 of the material unloading cylinder 23, the slurry and the electrolyte in the battery 35 are sucked downwardly by the suction pump 22, an interior of the material unloading cylinder 23 and an interior of the battery 35 are subjected to a downward acting force at the moment, and the supporting rod 238 on the outer wall of the rolling ball 234 is rotated to an axis of the cylinder body 235 under an action of a downward suction force at the moment, so that the rolling balls 234 on two sides are rotated to an inner side of the cylinder body 235 at the same time. One of the supporting rods 238 touches the bottom end of the knocking rod 236 and presses the bottom end of the knocking rod 236 downwardly, the knocking rod 236 and the rotating block 239 are rotated under an action of the supporting rod 238, and the striking ball 237 at the top end of the knocking rod 236 strikes an inner side of the battery at the moment. There is a magnetic attraction force between two second magnetic blocks 241 at the top ends of two knocking rods 236, and there is a magnetic repulsion force between two first magnetic blocks 240 at the bottom ends at the same time. After the supporting rod 238 is far away from the bottom end of the knocking rod, the knocking rods 236 on two sides are rotated back to original positions in opposite directions under actions of the magnetic attraction force and the magnetic repulsion force, and when the next supporting rod 238 touches the knocking rod 236 again, the above steps are repeated, so that the striking ball 237 continuously strikes the inner side of the battery 35 to make the battery 35 sway, which may make the slurry and the electrolyte in the battery drop rapidly, thereby improving a recycling efficiency of the slurry and the electrolyte in the battery 35, and avoiding decomposition gas and volatile toxic gas produced by the electrolyte from rapidly volatilizing outwardly.

In the present invention, when the device is in use, the turntable 32 is turned on by the controller 31 first, and the controller 31 may drive the turntable 32 to rotate and stop regularly. The fixing assembly 34, the recycling device 2 and the treatment device 4 are turned on at the same time, the bottom portion of the turntable 32 is provided with the plurality of fixing assemblies 34, the bottom portion of each fixing assembly 34 is provided with one battery 35, and the vacuum negative pressure pump 345 at the bottom portion of the fixing assembly 34 may produce a negative pressure through the sucker 346 to absorb the battery 35 at the bottom portion. With the rotation of the turntable 32, when the fixing assembly 34 and the battery 35 at the bottom portion are rotated to the front side of the turntable 32, the turntable 32 stops rotating at the moment, and an external cutting assembly may cut off the bottom end of the battery 35. When the bottom end of the battery 35 is located at the top portion of the cylinder body 235 of the material unloading cylinder 23, the suction pump 22 sucks the slurry and the electrolyte in the battery 35 downwardly for dropping, the interior of the material unloading cylinder 23 and the interior of the battery 35 are subjected to the downward acting force at the moment, and the supporting rod 238 on the outer wall of the rolling ball 234 is rotated to the axis of the cylinder body 235 under the action of the downward suction force at the moment, so that the rolling balls 234 on two sides are rotated to the inner side of the cylinder body 235 at the same time. One of the supporting rods 238 touches the bottom end of the knocking rod 236 and presses the bottom end of the knocking rod 236 downwardly, the knocking rod 236 and the rotating block 239 are rotated under the action of the supporting rod 238, and the striking ball 237 at the top end of the knocking rod 236 strikes the inner side of the battery 35 at the moment. There is the magnetic attraction force between two second magnetic blocks 241 at the top ends of two knocking rods 236, and there is the magnetic repulsion force between two first magnetic blocks 240 at the bottom ends at the same time. After the supporting rod 238 is far away from the bottom end of the knocking rod, the knocking rods 236 on two sides are rotated back to the original positions in opposite directions under the actions of the magnetic attraction force and the magnetic repulsion force, and when the next supporting rod 238 touches the knocking rod 236 again, the above steps are repeated, so that the striking ball 237 continuously strikes the inner side of the battery 35 to make the battery 35 sway. Meanwhile, the driving assembly 348 at the top portion drives the slider 344 to reciprocate rapidly on the movable rod 343 through the electric push rod 347, and then the slider 344 drives the battery at the bottom portion to sway left and right. The fixing assembly 34 can not only facilitate fixing and disassembly of the battery 35, but also make the slurry and the electrolyte in the battery 35 sway to drop rapidly. Meanwhile, the combination of the material unloading cylinder 23 and the suction pump 22 may rapidly convey the slurry and the electrolyte in the battery 35 to the treatment device 4 for treatment, thereby improving the recycling efficiency of the slurry and the electrolyte in the battery 35, avoiding the decomposition gas and the volatile toxic gas produced by the electrolyte from rapidly volatilizing outwardly, and solving the problem that harmful gases volatilized from the electrolyte will cause environment pollution. After a period of time, the slurry and the electrolyte in the battery 35 completely drop into the material unloading cylinder 23, and then the turntable 32 is rotated continuously. The slurry in the next battery 35 also drops into the material unloading cylinder 23, then the slurry and the electrolyte in the material unloading cylinder 23 reach the centrifuge 45 through the material discharging pipe 26 and the material guiding pipe 47, and the centrifugal motor 46 centrifugally filters and separates the slurry in the centrifuge 45 into the positive electrode material solid phase and the N-Methyl Pyrrolidone (NMP) liquid phase. The N-Methyl Pyrrolidone (NMP) liquid phase is recycled through the separation pipe 42 on the front side, thus recycling the N-Methyl Pyrrolidone (NMP) liquid phase. The electrolyte is recycled through the separation pipe 42, the recycled electrolyte is condensed in a sealed state and adsorbed by activated carbon, the decomposition gas produced by the electrolyte is purified, and harmful gases of phosphorus pentafluoride and hydrogen fluoride in the decomposition gas can be eliminated, thereby avoiding environment pollution, and solving the problem of leakage of the harmful gases in a recycling process of the electrolyte of the waste battery in the existing technology. The positive electrode material solid phase reaches the treatment device 4 through the material conveying pipe 43 for treatment, the positive electrode material solid phase drops on the top portion of the calcination turntable 442 first, and the stop block 449 exerts a blocking effect to avoid the positive electrode material solid phase on the calcination turntable 442 from dropping downwardly, and the high temperature calcination assembly is arranged in the stop block 449. The positive electrode material solid phase is subjected to high temperature calcination at the top portion of the calcination turntable 442, the connecting rod 443 is rotated after treatment, the connecting rod 443 drives the calcination turntable 442 to rotate, and the slot 4411 of the calcination turntable 442 is rotated outwardly, so that the treated positive electrode material solid phase drops downwardly on the top portion of the crushing plate 444. The rotating motor 4412 drives the crushing blade 445 at the bottom portion to rotate at a high speed, the crushing blade 445 may crush the positive electrode material solid phase on the top portion of the crushing plate 444 into powder, and the powder of the positive electrode material solid phase goes downwardly to the acid leaching cylinder 446 for acid leaching and recycling, thereby recycling various metal elements in a positive electrode slurry material. Meanwhile, the treatment mode increases a recycling rate of the metal elements in the positive electrode material, and then improves the efficiency in an operation process, thereby reaching a highest recycling rate of resources, having a simple operation flow, and realizing a high operating efficiency.

Although the present invention is described in detail with reference to the embodiments above, those skilled in the art may still modify the technical solutions recorded in the embodiments above, or make equivalent substitutions to some of the technical features. Any modification, equivalent substitution and improvement made within the spirit and principle of the present invention should fall within the scope of protection of the present invention.

The invention claimed is:

1. An apparatus for efficiently pretreating and recycling a waste battery, comprising a bottom plate (1), a recycling device (2), a conveying device (3) and a treatment device (4), one end of a top portion of the bottom plate (1) being fixedly mounted with a bottom portion of the conveying device (3), and the other end of the top portion of the bottom plate (1) being fixedly mounted with a bottom portion of the treatment device (4), wherein the conveying device (3) comprises a controller (31), a turntable (32) and a supporting frame (36), a top portion of the turntable (32) is movably mounted with a bottom portion of the controller (31), a plurality of fixing assemblies (34) are uniformly provided at a bottom portion of the turntable (32), the fixing assembly (34) comprises a mounting block (341), a movable rod (343), a slider (344), a vacuum negative pressure pump (345) and a sucker (346), two opposing sides of the mounting block (341) are each fixedly connected with a respective extension rod (342), and two ends of the movable rod (343) are each fixedly connected with an end of the respective extension rod (342), an outer wall of the movable rod (343) is slidably connected with an inner wall of the slider (344), one end of the movable rod (343) is fixedly connected with a driving assembly (348), an electric push rod (347) is arranged inside the movable rod (343), one end of the electric push rod (347) is movably mounted with one end of the driving assembly (348), the other end of the electric push rod (347) is movably mounted with one end of the slider (344), a top portion of the vacuum negative pressure pump (345) is fixedly mounted with a bottom portion of the slider (344), a bottom portion of the vacuum negative pressure pump (345) is movably connected with a top portion of the sucker (346), the treatment device (4) comprises a base (41), a material conveying pipe (43), a centrifuge (45), a material guiding pipe (47) and a recycling treatment cylinder (44), the recycling treatment cylinder (44) comprises a housing (447), a top cover (441), a connecting rod (443), a crushing plate (444), an acid leaching cylinder (446), a rotating motor (4412) and a stop block (449), an inner side of a top end of the housing (447) is fixedly connected with a fixing ring (4410), an inner wall of the fixing ring (4410) is slidably connected with an outer wall of a calcination turntable (442), a slot (4411) is formed to penetrate through one end of a top portion of the calcination turntable (442), a top portion of the fixing ring (4410) is fixedly mounted with a bottom portion of the stop block (449), the top portion of the calcination turntable (442) is fixedly connected with a bottom portion of the connecting rod (443), a top portion of the crushing plate (444) is movably connected with a bottom portion of the rotating motor (4412), and a plurality of crushing blades (445) are uniformly arranged outside a bottom end of the rotating motor (4412).

2. The apparatus for effectively pretreating and recycling the waste battery according to claim 1, wherein an inner wall of the housing (447) is fixedly mounted with an outer wall of the crushing plate (444), an inner wall of a bottom portion of the housing (447) is fixedly connected with a bottom portion of the acid leaching cylinder (446), and a leading-out pipe (448) is provided at one side of the acid leaching cylinder (446).

3. The apparatus for effectively pretreating and recycling the waste battery according to claim 1, wherein a top portion of the housing (447) is fixedly mounted with a bottom portion of the top cover (441), and a bottom portion of the housing (447) is fixedly mounted with one end of the top portion of the bottom plate (1).

4. The apparatus for effectively pretreating and recycling the waste battery according to claim 1, wherein a bottom portion of the sucker (346) is provided with a battery (35), a top portion of the base (41) is fixedly mounted with a bottom portion of the centrifuge (45), and a top portion of the centrifuge (45) is provided with a centrifugal motor (46).

5. The apparatus for effectively pretreating and recycling the waste battery according to claim 1, wherein a front side of the centrifuge (45) is fixedly communicated with a separation pipe (42), one end of a top portion the centrifuge (45) is fixedly communicated with one end of the material guiding pipe (47), and one side of the centrifuge (45) is fixedly communicated with one end of the material conveying pipe (43).

6. The apparatus for effectively pretreating and recycling the waste battery according to claim 1, wherein one end of the material conveying pipe (43) is fixedly connected with a top portion of the top cover (441), a top portion of the mounting block (341) is fixedly connected with the bottom portion of the turntable (32), a top portion of the supporting frame (36) is fixedly connected with the bottom portion of the controller (31), and a bottom portion of the supporting frame (36) is fixedly mounted with the top portion of the bottom plate (1).

7. The apparatus for effectively pretreating and recycling the waste battery according to claim 1, wherein the top portion of the turntable (32) is provided with a plurality of connecting lines (33), the recycling device (2) comprises a fixing plate (21), a suction pump (22), a material unloading cylinder (23) and a bearing ring (27), an outer wall of the material unloading cylinder (23) is fixedly mounted with an inner side of the bearing ring (27), and a bottom portion of the material unloading cylinder (23) is provided with a through hole (24).

8. The apparatus for effectively pretreating and recycling the waste battery according to claim 7, wherein a top portion of the fixing plate (21) is fixedly mounted with a bottom portion of the suction pump (22), a top portion of the suction pump (22) is movably connected with the bottom portion of the material unloading cylinder (23), and one side of a bottom end of the material unloading cylinder (23) is fixedly communicated with a material discharging pipe (26).

9. The apparatus for effectively pretreating and recycling the waste battery according to claim 8, wherein one end of the material discharging pipe (26) is fixedly communicated with one end of the material guiding pipe (47), a bottom portion of the bearing ring (27) is uniformly and fixedly connected with four supporting rods (25), and a bottom portion of the supporting rod (25) is fixedly mounted with the top portion of the fixing plate (21).

10. The apparatus for effectively pretreating and recycling the waste battery according to claim 7, wherein the material unloading cylinder (23) comprises a cylinder body (235), a knocking rod (236), a circular ring (233) and a striking ball (237), a top portion of the cylinder body (235) is fixedly mounted with a bottom portion of the circular ring (233), an inner side of a top end of the cylinder body (235) is symmetrically and fixedly connected with two second bearing rods (232), an outer wall of each of the two second bearing rods (232) is rotatably connected with a rolling ball (234), an outer wall of the rolling ball (234) is uniformly and fixedly connected with three supporting rods (238), an inner side of the cylinder body (235) is symmetrically and fixedly connected with two first bearing rods (231), an outer wall of each of the two first bearing rods (231) is movably connected with a rotating block (239), an inner side of the rotating block (239) is fixedly mounted with a bottom end of the knocking rod (236), a top portion of the knocking rod (236) is fixedly connected with a bottom portion of the striking ball (237), an inner side of a top end of the knocking rod (236) is provided with a second magnetic block (241), and an inner side of the bottom end of the knocking rod (236) is provided with a first magnetic block (240).

\* \* \* \* \*